United States Patent Office 3,825,441
Patented July 23, 1974

3,825,441
METHOD FOR IMPREGNATING CORRUGATED CARDBOARD, AND RESULTANT PRODUCT
Werner Achermann and Franz Achermann, Zurich, Switzerland, assignors to Boise Cascade Corporation, Boise, Idaho
Original appplication Sept. 27, 1968, Ser. No. 763,268, now Patent No. 3,669,067. Divided and this application Mar. 3, 1972, Ser. No. 231,522
Int. Cl. B44d 1/02
U.S. Cl. 117—119
12 Claims

ABSTRACT OF THE DISCLOSURE

Method for impregnating corrugated cardboard during the manufacturing process forming the said corrugated cardboard, and resultant product. A vacuum is formed within the corrugations of the cardboard and impregnating material is introduced into the corrugations under the influence of the said vacuum. The impregnating material is introduced under conditions which may be varied with respect to composition, temperature, viscosity and other variable process parameters. The apparatus of this invention includes a means for producing a suction on one edge of a corrugated cardboard while introducing impregnating material at the other edge of the corrugated cardboard as it passes through the impregnating apparatus.

---

This is a divisional application of application Ser. No. 763,268 filed Sept. 27, 1968, now U.S. Pat. No. 3,669,067.

BACKGROUND OF THE INVENTION

The impregnation of corrugated cardboard has been accomplished either during its manufacturing process or on corrugated cardboard containers ready to be packed. In the latter instance, only the external surfaces of the containers are impregnated.

All conventional prior art corrugated cardboard equipment includes a drying plant as well as a cross-cutter used to eliminate pieces of corrugated cardboard which are unuseable. The unuseable waste cardboard results especially when a new type of corrugated cardboard is introduced into the equipment for processing. The prior art corrugated cardboard equipment also includes an apparatus which is used for longitudinal cutting and grooving. This longitudinal cutting and grooving equipment is located about 3 meters from the cross-cutter device used in the prior art equipment.

PURPOSE OF THE INVENTION

A primary object of this invention is to provide a process for impregnating corrugated cardboard through the use of a vacuum atmosphere.

Another object of this invention is to provide a continuous evacuation of the open corrugations on finished corrugated cardboard and then introducing an impregnating material into the said open corrugations.

A further object of this invention is to form a spray of the impregnating material and introduce the said spray into the evacuated corrugations of the cardboard at some point in the production of the corrugated cardboard material.

Another object of this invention is to provide an apparatus to form a vacuum within the open corrugations of the cardboard and to subsequently introduce impregnating material into the evacuated corrugations.

SUMMARY OF THE INVENTION

The basic process of this invention involves the formation of a vacuum within the corrugations of the cardboard being treated. Subsequently a treating material selected from the group consisting of plastics, water glass, bitumen, paraffin, resin, glue, paraffin-bitumenized emulsion, artificial resin wax mixture, liquid synthetic materials, foaming plastics, artificial resins, silicon, sodium silicate solution, alkali metal silicate, vinyl resin, and other material that may be used to provide durability and waterproofing to corrugated cardboard.

One method of carrying out the basic impregnating process of the instant invention involves the stacking of corrugated cardboard sheets onto a pallet having two smooth side walls. The outside sheets of the pile are flush against the two smooth side walls of the pallet and the sheets of the stack are laid so that the corrugations run horizontally and are open at the side. When one pallet is full, the whole pile is subjected to a uniform light clamping pressure which may be applied by moving two pallet walls together. This light clamping pressure eliminates the possibility of air flow between the individual sheets and thereby results in a flow of air through the open corrugations of the stacked sheets. The stack of corrugated cardboard sheets is then placed in a vacuum chamber. A very hot stream of compressed air is passed through the chamber to reduce the humidity in the pile of corrugated cardboard. After drying, the air is extracted from the chamber and a vacuum is formed which penetrates into the smallest interstices in the corrugated cardboard. A vacuum pressure is therefore present both inside and outside of the pile within the vacuum chamber. A flow of air containing highly concentrated impregnating material which has been finely atomized is then introduced into the vacuum chamber. The pressure within the vacuum chamber is additionally increased by the introduction of a pressure layer. Upon introduction into the vacuum chamber, the impregnating material penetrates into the smallest spaces of the corrugations so that impregnating is accomplished from the inside of the corrugations to the outside of the corrugated cardboard. Because the external surfaces are in contact with each other within the pile, they do not come in contact with the impregnating material. This manner of impregnating causes the corrugated sheets and internal layers of the corrugated cardboard to be impregnated while a fine layer of outer paper remains untouched by the impregnating material. The resultant sheets can be pressed and glued normally at the next processing stage. The impregnating material must be of a low viscosity and easily atomized to be used in the process involving the vacuum chamber. If the impregnating solution has a high humidifying property, then a very slight penetration of the paper in the cardboard is effected. Upon drying the sheets treated in the vacuum chamber, the impregnating material should have an adhesive effect so that there is a water-tight bond between the lining sheets of the corrugated cardboard. This latter function is particularly important where lining papers are thin.

Another embodiment of the invention involves the application of a suction effect at one end of the open corrugations while introducing impregnating material either as a spray or as a liquid in the other end of the corrugations. Here again the impregnating is accomplished from the inside of the cardboard to the outside of the cardboard so that it is possible that the two lining or outer sheets of the corrugated cardboard may remain free of impregnating material. As long as the outer layers or lining sheets of the corrugated cardboard are free of impregnating material they can be printed on or labeled. As the air is extracted from the corrugations by a blower, a stream of air containing a highly concentrated and finely atomized impregnating material is introduced into the other end of the corrugations. The air extracting blower brings into circulation a continuous flow of air and impregnating material. This continuous circulation of air provides the pile of corrugated cardboard with continuous treatment and saturation with the impregnating material for a definite period of time. When the impregnating material is in liquid form, the corrugated cardboard is dipped on one side with its open corrugations for a depth of about two centimeters into the impregnating liquid. As the air is extracted from the other end of the corrugations, an induction effect causes the liquid impregnating material to rise bubble free and flow through the corrugated cardboard from the inside. Once the impregnating liquid has flowed completely through the corrugated cardboard the remaining liquid is pumped out by another apparatus so that only a fine unbroken layer of impregnating material remains. Water placed on the outermost layer of the cardboard paper will prevent the impregnating liquid from entering that layer. Therefore, once the cardboard paper is dried out, the outermost layer of the cardboard may be printed on or labeled due to the absence of the impregnating material.

A specific apparatus contemplated by the instant invention includes a suction element for extracting air from open corrugations and an inlet element for introducing impregnating material into the evacuated corrugations. Each of these elements grip and seal the open longitudinal edges of the corrugated cardboard as it moves through the apparatus. Each of the elements has separate chambers which accomplish different functions as desired by the operating personnel. When air is evacuated from the corrugations of the cardboard, there is an infiltration of air from outside of the cardboard through the voids in the lining or outer papers. To prevent this infiltration of air, the two operating elements are joined together by a removable sealing panel located above the corrugated cardboard strip.

BRIEF DESCRIPTION OF DRAWINGS

Other objects of this invention will appear in the following description and appended claims, reference being made to the accompanying drawings forming a part of the specification wherein like reference characters designate corresponding parts in the several views.

In the accompanying drawings, wherein illustrative embodiments of the invention are disclosed.

DESCRIPTION OF SPECIFIC EMBODIMENTS

Figure 1:
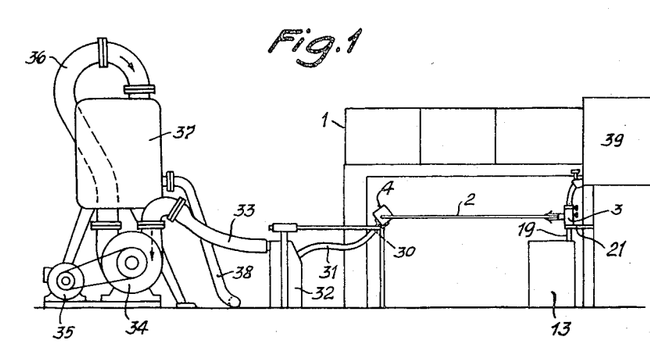
FIG. 1 shows a diagram of an impregnating apparatus made in accordance with this invention.
Figure 2:
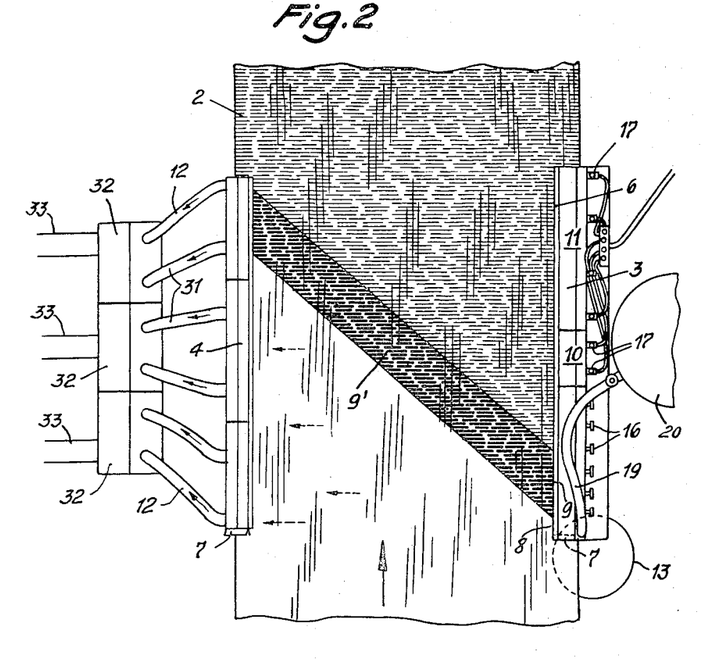
FIG. 2 shows a top view of the corrugated cardboard strip as it passes through the impregnating apparatus.
Figure 3:
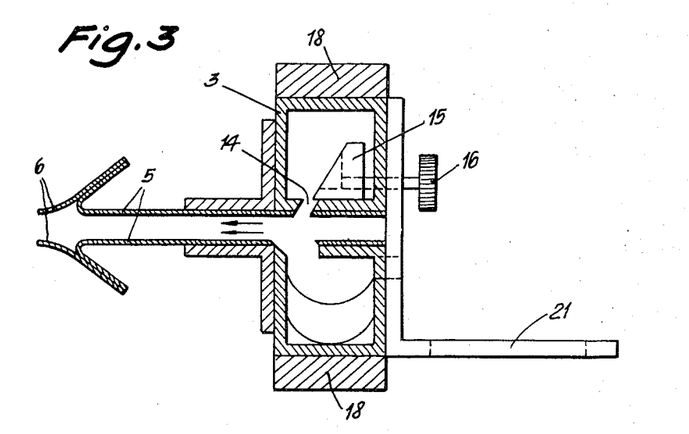
FIG. 3 shows a cross-sectional view of an input element made in accordance with this invention.

More specifically, the impregnating plant 1 of a corrugated cardboard machine is illustrated in FIG. 1. The corrugated cardboard strip 2 runs with its longitudinal edges on one side through an input element 3 and on the other side through a suction element 4. The input element 3 is an elongated, divided housing having guide rails 5 for guiding the corrugated cardboard 2 through the said cardboard machine. Sealing flanges 6 made of resilient material are located on the outer longitudinal edges of the guide rails 5. These sealing flanges 6 bear against the upper and lower sides of the corrugated cardboard strip 2 as it is guided through the input element 3. Sealing elements 7 are located on the front and rear faces of the input element 3 and bear on the corrugated cardboard 2 as it passes through the impregnating plant 1. The vacuum chamber 8 is connected to the sealing element 7 along the inlet side of the input element 3. The vacuum chamber 8 is connected to a suction box 32 by way of a suction conduit 12. The input element 3 further includes an intake chamber 9 which is attached to the vacuum chamber 8. The intake chamber 9 includes inlets 14 for introducing impregnating materials into the machine. Flow of the impregnating materials through inlets 14 may be regulated by means of the chokes 15 controlled by the adjusting screws 16. A pressure chamber 10 is located in the input element 3 adjacent the intake chamber 9. Pressure chamber 10 supplies hot compressed air and the next adjacent pressure chamber 11 supplies cold compressed air. Adjustable inlets 17 supply hot and cold compressed air into the pressure chambers 10 and 11 respectively. Electrical heating elements 18 are located adjacent the inlets 14 in the input element 3. Liquid impregnating material is stored in the container 20 and conveyed therefrom through a conduit 19 to the input element 3. When the vacuum is disconnected in the input element 3, any remaining impregnating material flows into the outflow container 13. The input element 3 is mounted on the casing of the corrugated cardboard machine by the flange 21. The input element 3 is mounted to fit onto the edge of the corrugated cardboard strip 2.

Figures 4, 5:
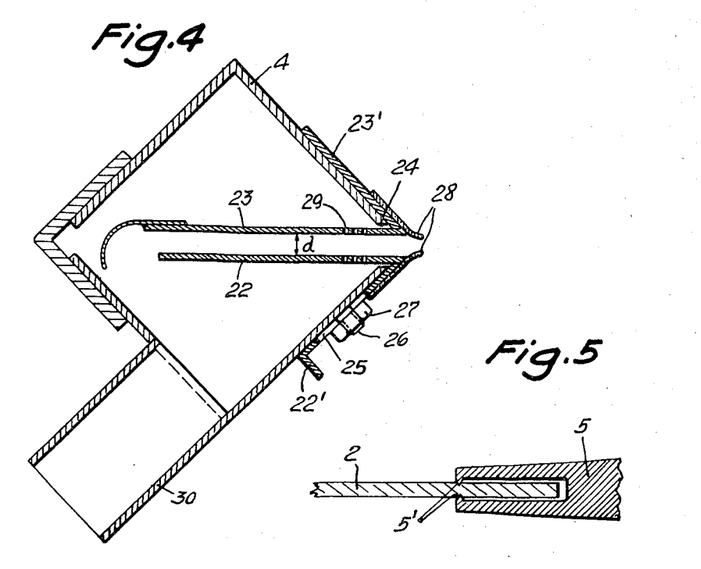
FIG. 4 shows a cross-sectional view of a suction element made in accordance with this invention.
FIG. 5 is a partial sectional view showing a method of sealing the edge of the corrugated cardboard strip as it passes through the impregnating apparatus.

The suction element 4 has an elongated, divided housing which includes guide rails 22 and 23. These guide rails 22 and 23 engage the casing in a longitudinal slot 24 through which the other edge of the corrugated cardboard strip 2 is guided. The longitudinal edges of the guide rails 22 and 23 stand out from the longitudinal slot 24 and have flanges 22' and 23' connected thereto respectively. These flanges 22' and 23' bear on the outer side of the suction element 4. The flange 23' is fixedly attached to the casing wall of the element 4. The flange 22' is adjustably mounted onto the casing wall of the suction element 4 by means of guiding slot 25, threaded bolts 26 and nuts 27. The adjustability of flange 22' enables the guide distance "b" between the guide rails 22 and 23 to be altered as desired. Elastic sealing flanges 28 are fixedly attached to flanges 22' and 23' and project above the outer longitudinal edges of the guide rails 22 and 23. These elastic sealing flanges 28 bear on the upper and lower sides of the corrugated cardboard strip 2. The holes 29 located near the outer longitudinal edges of the guide rails 22 and 23 are for air extraction.

The suction element 4 includes separates chambers provided with intakes 30. The intakes 30 for each of the chambers are connected to a corresponding chamber in the suction box 32 by way of hoses 31. The conduits 33 connect the chambers of the suction box 32 with a vacuum pump 34 which is driven by an electric motor 35. Additional suction apparatus may be used in the production of the desired vacuum where it is necessary. The chambers of the suction box 32 serve as a vacuum container and a preliminary separator. The impregnating material is conveyed through the exhaust pipe of the suction pump 34 through a pipe 36 to an impregnating material separator 37. Reclaimed impregnating material is then conveyed from the separator 37 to a reservoir 39 through a restoring mechanism 38 which is only partially shown. The reclaimed impregnating material is then returned to the impregnating material container 20 through a conduit (unnumbered).

In operation, the finished corrugated cardboard strip 2 travels through the impregnating apparatus 1 at a rate of from 60 to 120 meters per minute. It is possible, however, that the cardboard strip might travel at a faster rate. One of the longitudinal edges of the corrugated cardboard strip 2 is conveyed through the input element 3 and the other longitudinal edge is conveyed through the suction element 4 under completely leak-proof conditions. The suction element 4 causes the evacuation of air from the corrugations of the strip 2. The corrugated strip is heated as it passes through the suction element 4 to prevent the precipitation of the impregnating material thereby eliminating the possiblity of blockage. The location of the intakes 30 at equal intervals along the suction element 4 aids in the production of an evenly applied vacuum by the vacuum pump 34. The operation of the suction box 32 as a liquid separator prevents the liquid impregnating material from reaching the pump 34. The separated impregnating liquid is conveyed from the suction box 32 to the reservoir 20 by way of a heated pumping system not shown. The suction box 32 is also heated. The return of reclaimed impregnating material from the material separator 37 and the suction box 32 to the material reservoir 20 constitutes a closed circuit flow for the impregnating material used in this process. The air which has been purified in the separating device 37 is conveyed to the compressed air elements 10 and 11 in the inlet element 3. The impregnating material is sucked into the corrugations of the corrugated cardboard strip 2 in the area of zone 9 due to the operating pressure of the element 4 and the operating pressure of the inlet element 3. The impregnating material is heated to a very high temperature by the heating elements 18 in the inlet element 3 and subsequently penetrates the corrugations of the strip 2. A diagonal flow movement 9' is formed from the inlet element 3 to the suction element 4 due to the high speed of the cardboard strip 2 through the apparatus and the speed of flow of the impregnating material passing into the corrugations under the influence of the suction from the suction element 4. The subsequent hot compressed air zone 10 and cold compressed air zone 11 cause air to press through the corrugations once the impregnating material has been introduced through the inlet zone 9. The compressed air zones 10 and 11 thereby aid in the drying of the corrugations which have been wetted by impregnating material.

The effectiveness of the process of impregnating the corrugated cardboard strip with liquids is greatly dependent upon the vacuum attained in the apparatus. It is extremely important that the vacuum have a continuous and regular effect so that a large amount of air may be controlled by it. The greater the vacum, the greater is the acceleration of velocity of the impregnating liquid into the corrugations of the strip 2.

The lining sheets or outer papers of the corrugated cardboard strip 2 are very porous. Therefore, a considerable amount of air penetrates the pores into the corrugations thus causing a significant loss to the vacuum being applied to draw the impregnating liquid into the corrugations. It has been found that the application of a fine film of water before the impregnating step of the process provides an effective sealing of the pores and thus increases the vacuum during the impregnating step.

The sealing of the corrugated cardboard may also be achieved by suitable mechanical measures. An arrangement of screened vacuum zones above and below the cardboard strip 2 as it passes through the impregnating apparatus would significantly eliminate air above and below the surface of the cardboard strip 2. Another method might involve the installation of strips of sealing foil on caterpillar rollers located above and below the said cardboard strip 2. The sealing foil would effectively keep the pores of the outer papers closed against the inward flow of air.

There are several ways of conveying the impregnating liquid into the horizontally moving corrugated cardboard strip 2 on the inlet element 3. The first method allows the impregnating material to flow in the form of a curtain of liquid past the openings in the corrugations. The vacuum formed in the corrugations due to the action of the suction element 4 sucks the curtain of impregnating liquid into the corrugations as it falls by the said openings. A second method provides for the attachment of an additional suction element located on the inlet side of the apparatus to act on the corrugation openings. The use of such an additional vacuum on the corrugation openings draws the liquid impregnating material onto the suction element 4 thereby sucking it through the corrugations. The third method brings the level surface of the impregnating liquid up to the height of the corrugated cardboard strip 2. As the surface reaches the openings of the corrugations, the impregnating liquid is sucked into the corrugations by the vacuum. A fourth method provides for a specially formed input device which is well sealed and presses firmly against the lateral movements and shifts of the edge of the cardboard strip 2. The impregnating material is fed into the corrugations by means of the specially formed input device. The impregnating material moves through the corrugations as soon as it is influenced by the vacuum caused by suction element 4. It is possible, in this instance, to have adjustable metering pumps built into the input apparatus which force the impregnating material into the corrugations at variable pressures or inject the material into the corrugations through the use of jet nozzles.

The length of the inlet stage varies from one method to another. However, it is always necessary to have a short sealing zone 8 to allow the vacuum to build up in the corrugations before passing on to the inlet zone 9. The sealing zone 8 may be either active or passive with regard to the air pressure inside the corrugations of the strip 2.

Small columns of impregnating liquid adhere to the corrugations as the strip 2 moves through the inlet zone 9. These small columns of impregnating liquid taken collectively make a sealing strip 9' which runs diagonally across the whole width of the corrugated cardboard strip 2. A continuous diagonal flow of the impregnating liquid divides the corrugated cardboard strip 2 into two vacuum zones. There is a drawing action by the vacuum on the suction side and a braking effect on the inlet side due to an increasing degree of vacuum. The braking effect is undesirable and can only arise if the whole inlet side is hermetically sealed. This braking effect is eliminated by allowing metered air flow immediately following the input zone 9. The metered flow of air is at normal atmospheric pressure. The combination of the air flow at atmospheric pressure and the pull of the vacuum on the other side of the diagonal liquid strip 9' causes an acceleration of the speed of flow of the impregnating materials through the corrugations.

However, the capacity for acceleration caused by a metered flow at atmospheric pressure is not sufficient for use at the high production speeds. Therefore, the air introduced on the inlet side in zones 10 and 11 after the input zone 9 must be compressed. This air is blown directly into the corrugations immediately behind the impregnating liquid. The compressed air zones 10 and 11 include jets which are specially designed to introduce the air under high pressure and at great speed into the corrugations. Because the high rate of air flow into the corrugations would provide a sudden cooling and slowing of the impregnating process, compressed air introduced in zone 10 must be previously heated to at least 120° C. The hot compressed air of zone 10 performs several functions. One, it accelerates the proofing liquid; two, it prevents a too concentrated deposit of impregnating material due to its heating preventing rapid cooling of the material thereby providing an economic use of the liquid impregnating material; three, it cleans the corrugations and blows out all remnants of the impregnating liquid from the corrugations due to the high speed and total amount of air flow.

The essential stage of cooling the impregnated corrugations is accomplished in zone 11 directly after the hot compressed air zone 10. Cold compressed air is forced through the corrugations as the strip 2 passes through zone 11. The cold compressed air cools the impregnated corrugations as it escapes through the open corrugations on both sides of the strip 2.

When the lining or outer papers of the corrugated strip 2 have been moistened with a film of water, the strip 2 may be ventilated from the outside with a warm or cold stream of air. This stream of air causes a rapid evaporation of the film of water thereby producing a thorough cooling of the corrugated cardboard. To preserve the necessary impregnating temperature of the impregnating material on the inlet side of the apparatus, both the inlet and suction sides of the apparatus are heated. The heating of the suction side results in obtaining the remaining impregnating material in liquid form where it passes to the separators 22 and 37 and then returns from there to the inlet side of the apparatus. The maintaining of a higher temperature throughout the apparatus is particularly important where the impregnating materials have high melting points and very hot sprays are used during the impregnating step. A separate blower placed immediately ahead of the zone where the corrugated cardboard enters the impregnating stage continuously extracts the main quantity of air from the corrugations. This enables the vacum pump 34 to have its full effect during operation of the impregnating apparatus.

The impregnating apparatus of this invention is very versatile. It can be adapted to any existing corrugated cardboard machine as a compact high performance apparatus located betwen the cross-cutter 41 and the "triplex" 42. Alternatively, it can be built into new plants as a fixed component. The equipment of this invention can also be built in the drying stage of the corrugated cardboard machine above the final heating plates. This location is especially important in the case where cold, plastic water emulsions are used in the impregnating process.

Multi-ridged corrugated cardboard is produced with different sized ridges and thus shows varying heights along the corrugated layer. This physical characteristic attributed to corrugated cardboard necessitates special adjustment and control of the impregnating material supply to fit the particular corrugated layer. That is, the flow conditions for the coarse corrugation (A group) is quite different from that necessary in the fine corrugation (B group). The A group coarse corrugation requires a shorter inlet stage in relation to the path traveled because it has a greater capacity to take in impregnating material. Under these conditions, the impregnating material attains a much higher rate of flow through the corrugations due to the better flow conditions that exist in the fine B group corrugations. It is therefore necessary to feed the corrugated layers separately with impregnating material from a separate inlet device which takes account of the different types of corrugations. To avoid this particular complication, it is possible to construct the corrugated cardboard of material to obtain the most favorable flow penetration for the impregnating material. That is, the intermediate sheets of the corrugated paper must consist of a specially thin, absorbent material to provide an easier and swifter penetration of the impregnating liquid.

Another type of corrugated cardboard construction includes the use of at least two corrugated layers having equal size. This type of cardboard construction is possible due to the stabilizing effect of the impregnating material being applied in this process. In this instance, the corresponding ridges are placed against one another so that one ridge supports the other and the subsequent corrugated layers are fed through the impregnating apparatus in this manner. This construction and method of feeding the corrugated cardboard results in having all of the corrugations supplied with the impregnating liquid under the same conditions. The repeated use of the same ridge size takes on particular importance in the process of spraying out the corrugations with foam. In this instance, the hardened plastic foam provides a completely new condition of stability.

The depth of penetration of the impregnating material depends on various factors. It is a function of the variation of the speed with which the impregnating material flows over the corrugated cardboard strip. It is also a function of the temperature of the impregnating material being used in the process. The change of the temperature of the air, the metering and variation of pressure of air needed for various purposes in the process also influence the depth of penetration of the impregnating liquid. The rate of flow through the corrugations of the cardboard is dependent on the strength of the vacuum employed in the system. This flow through the corrugations can in turn be influenced by external means such as a film of water placed on the cardboard or by advance steaming out of the corrugations. A rapid evaporation of the film of water from the outside will effect a check on the depth of penetration by the impregnating material. The rapid evaporation of the water film causes a chill to be produced on the corrugated cardboard. The depth of penetration by the impregnating material also depends on the speed at which the corrugated cardboard is produced. Finally, various types of impregnating materials will provide different results with regard to depth penetration as well as the viscosity of the material being used.

In light of these many varied factors for depth penetration into corrugated cardboard, it is obvious that any required impregnation is possible in most of the varied types of corrugated cardboard being produced. For example, it is possible to produce a completely impregnated corrugated cardboard which can be distinguished externally by a dark coloring on both sides depending on the material selected for use. It is also possible to produce a partially impregnated corrugated cardboard in which both lining or outer sheets are light colored. It is further possible to produce one side of a corrugated cardboard being completely impregnated while the other side is partially impregnated so that they show externally as dark on one side and light on the other. Accurate external dampening may result in producing free surfaces for printing or labeling. In this case, the corrugated cardboard is dark on one side and the other lining or outer sheet has some dark and some light areas. Partial impregnating may also be carried out to produce corugated cardboard which shows dark and light areas on both sides. This latter product is produced by applying a partial film of water from the outside to produce areas which can be printed on or labeled. Where the corrugated cardboard is constructed of several layers of corrugations, it is possible to prepare only one corrugated layer with a complete impregnation. That is, only the outer layer which particularly requires impregnation may be treated while the inner layer is only partially or completely impregnated. The particular manner of impregnation is obviously dependent upon the desired use for the cardboard.

Infiltration of outside air into the spaces of the corrugations where there is a vacuum present is effected at a great pressure and deters the effectiveness of the vacuum. For this reason, it is desirable to take appropriate measures to slow down this process of air infiltration. As discussed hereinabove, a constant wetting throughout the operation to form a film of water over the lining or outer papers of the corrugated cardboard will slow down the rate of infiltration by the outside air. The wetting of the outermost layer of the lining paper of the cardboard prevents the lining material from being affected by the impregnating material. The wetting of the cardboard before, during and after the impregnating stage is a necessary precaution to preserve the protective film of water when hot impregnating materials are used. That is, the heat from the impregnating materials cause the water to evaporate. The vacuum present in the corrugation draws part of the film of water into the paper pores where it is evaporated on contact with the hot impregnating material. The slower speed of the flow of water through the pores of the cardboard forms a screen against any following air. On the other hand, by wetting the uppermost layer of paper in the cardboard, the impregnating material is prevented from completely penetrating the outer or lining paper. In this way, the application of a water film over the corrugated cardboard during the impregnating process serves a double purpose. When higher speeds of travel are used for the corrugated cardboard through the impregnating apparatus, much briefer wetting periods are available. In this instance, it is necessary to soften the water through the use of additives for the purpose of increasing the penetrative capacity of the water into the corrugated cardboard. An increase in the temperature of the water also serves to increase its penetrative capacity.

There is another method of achieving a reliable sealing of the lining paper of the cardboard which also provides a specially deep penetration by the impregnating material. This method includes the application of a film of impregnating material instead of water to the corrugated cardboard lining while a vacuum is provided exclusively on the inside of the corrugated cardboard. Or, when plastic water emulsion is used in place of the film of water, the water content of the emulsion vaporizes in the heat of the impregnating material having a high melting point This produces a tough outer layer of plastic having great tensile strength over the surface of the corrugated cardboard.

Other embodiments of the instant invention include methods of reducing the surface infiltrated air. Sealing cavities may be introduced above and below the impregnation zone on the corrugated cardboard as it passes through the impregnation apparatus. The sealing cavities are vacuum zones located immediately above and immediately below the said cardboard. These vacuum zones may be formed in several different ways. Vacuum may be formed in these cavities when the air is eliminated through the pores of the paper into the corrugations where a vacuum is being positively placed by the suction element 4. Once the air is eliminated through the pores in the paper, the protective vacuum zones or sealing cavities are formed.

The air may also be eliminated from these sealing cavities by the use of positive measures. A direct vacuum connection for eliminating the air from above and below the corrugated cardboard may be made with a blower or a vacuum pump. A positive suction produced from inside to outside causes a positive external vacuum as well as the vacuum being caused within the corrugations by the suction element 4. This aditional external vacuum causes the impregnating material to flow through the corrugations at a much greater speed. That is, the impregnating material actually is in the form of spray droplets which may be drawn from the inner parts of the corrugations to the outer layers of the paper thereby causing a very rapid penetration into the pores of the paper. Additional vacuum zones 8 located at the beginning and the end of the impregnating stage serve to seal the points of entry of infiltrated air into the cardboard at these particular locations. Although the corrugated cardboard can be evacuated exclusively through the outer or lining papers, it can be seen from the above discussion that the penetrative capacity of the impregnating material can also be regulated by controlling the vacuum condition both inside and outside of the corrugations of the corrugated cardboard.

Another embodiment of this invention contemplates the use of positive pressure zones located on the outside of the corrugated cardboard to reverse the conditions discussed hereinabove. In this manner, reactionary gases are forced into the paper pores in order to effect a strong reaction with a reactive impregnating material coming through from the inside of the corrugations to the outside of the cardboard. This provides a further means of controlling the impregnating process and the possibility of improving the quality of the impregnation of the corrugated cardboard material. Heating plates located above and below the corrugated cardboard as it passes through the impregnating apparatus can also influence the amount of infiltrated air which penetrates pores of the outer lining papers during the impregnating stage. The heated air above the papers rises thereby causing a reduction of pressure above the cardboard. In addition, the hot air keeps the temperature of the impregnating liquid elevated for a longer period of time and the overall heated condition of the paper, air and impregnating liquid enables the impregnation to be carried out much more easily. When powdered impregnating materials such as powered paraffin are used, the hot air penetrating the paper pores causes the individual particles to melt immediately thereby aiding in the impregnating process.

A further embodiment of this invention contemplates the use of a magnetic field apparatus in the place of heating plates. This apparatus is used to attract the impregnating material which has been previously dielectrically polarized in an opposite direction. In this way, the impregnating material is deposited on the paper layers when under the influence of the magnetic field. The use of magnetic apparatus to carry out this process is particularly useful when volatile impregnating materials are used in the form of sprays, powders, etc. The same results may be obtained magnetically when metal additives are added to the impregnating material. If the corrugated cardboard already contains a static charge of its own, the dielectric polarization of the impregnating material can be accomplished without the use of a magnetic apparatus. The static charge on the corrugated cardboard acts to strengthen the cardboard and form the opposite pole to the impregnating material which has been correspondingly polarized dielectrically before being introduced into the corrugations.

Another important embodiment of this invention requires the positive sealing along the inlet and suction elements as the corrugated cardboard passes through the impregnating apparatus. Sealing flanges 6 and 28 are mounted on the ends of the guiding members 5 and 22 and 23, respectively. The sealing flanges 6 and 28 are composed of a pliable material and extend inwardly of the width between the said guiding members 5, 22 and 23 to bear upon the corrugated cardboard as it passes through the apparatus. Since the guiding members 5, 22 and 23 can be regulated to conform to the thickness of the corrugated cardboard, the sealing flanges 6 and 28 will always provide a bearing effect upon the corrugated cardboard.

Sealing ridges 5' as shown in FIG. 5 may be used in place of sealing flanges 6 and 28. These sealing ridges 5' run in the direction of travel of the corrugated cardboard and press lightly on the lining paper to form very fine ripples on the corrugated cardboard as it passes through the apparatus.

Further embodiments of the invention which provide for the sealing between the cardboard and the apparatus include the use of clinging sealing elements along the lateral entry points for the corrugated cardboard strip. A particularly good seal is obtained by an inlet and suction apparatus that is continuously adapting itself to the horizontal shifts of the corrugated cardboard strip as it passes through the apparatus. This latter seal may be accomplished by having a single unit applying the impregnating material to the cardboard strip 2. This requires that an adjustable slot be located only at the entry and exit of the corrugated cardboard through the impregnating unit. This structure enables the inlet and suction sides to be connected to each other by a closed compartment.

Figure 7:
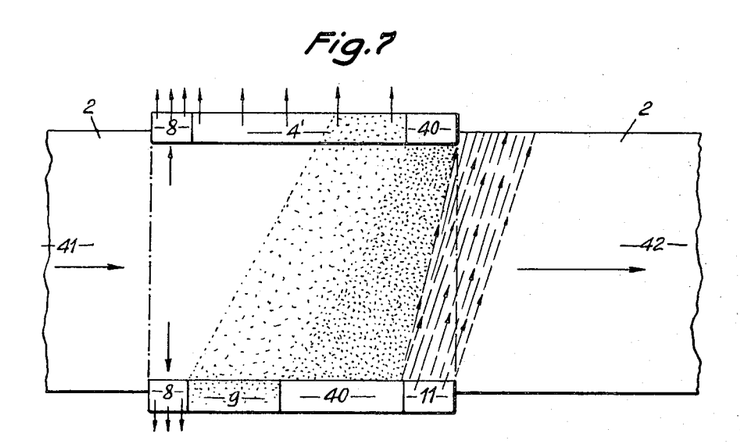
FIG. 7 shows a flow diagram when using spray impregnating materials introduced from one side of the apparatus only.

The spray application of a liquid impregnating material affords a very economical way of impregnating the corrugations of the cardboard. The application of compressed air passing out of slot jets placed behind a curtain of falling impregnating material forms a spray within the inlet element 3. These slot jets are located at short intervals directly behind the curtain of liquid and face the middle of the corrugations in the cardboard. The spray arrangement is located at the beginning of the inlet side in zone 9 adjacent to the evacuated zone 8 as shown in FIG. 7. A special apparatus acting under high pressure and producing a finely dispersed spray of impregnating material provides for the spraying of impregnating material into the corrugations without the use of the air. The use of such a special apparatus results in a particularly concentrated moistening of the corrugated cardboard. Alternatively, the impregnating material could be mixed with air in a very concentrated manner. An example of this would be the use of a spray gun principle wherein the impregnating material and air were mixed and subsequently sprayed directly into the corrugations of the cardboard.

The use of an impregnating liquid spray fundamentally changes the requirement conditions within the corrugations of the corrugated cardboard during the impregnation process. For instance, there is no flowing column of impregnating material flowing through the corrugations of the cardboard. Therefore the sealing function as described hereinabove does not take place at all. Furthermore, since the columns of liquid are no longer present in the corrugations, the braking effect due to the direct contact of the impregnating liquid with the inner surface of the corrugated cardboard ceases. Thus the friction of the column of liquid is completely eliminated through the use of a spray moving under the influence of compressed air. While the column of liquid moves at a speed of only 2 meters per second, the compressed air speed moving the spray through the corrugations reaches at least 80 meters per second. With the elimination of the braking effect, the high speed produced by the jets and by the high pressure necessary for atomization of the impregnating liquid can take place within the corrugations of the cardboard material. The travel through the corrugations by the sprayed impregnating liquid is completely unhindered. The liquid spray is accelerated into the corrugations where it immediately reaches the vacuum atmosphere caused by the suction operation of the suction element 4. This combination of spray operation and suction operation helps prevent any loss of speed to the impregnating liquid as it passes through the corrugations of the cardboard. Very fine droplets of spray moisten the inner surfaces of the corrugated cardboard while the material travels from zone 9 in the inlet element 3 to the suction element 4' as shown in FIG. 7. A deposition of the impregnating spray is very limited. Therefore, to prevent a large loss of impregnating material due to the unused quantities of spray, the spray may be conveyed by special jets into a revolving helical spray. This method of spraying the droplets of impregnating material into the corrugations causes the material to be deposited onto the inner walls of the corrugations due to the centrifugal forces resulting from the revolving helical spray.

It is very obvious that a very fine adjustment of the degree of impregnation is available when using the spray method of impregnation. The better the control, the better is the efficiency and the profitability in using the particular process of impregnation.

Figure 8:
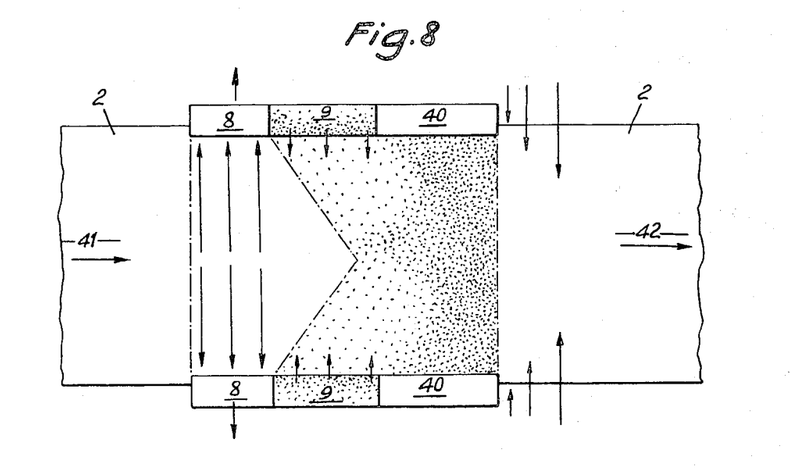
FIG. 8 shows a flow diagram when using spray impregnating materials introduced from opposite sides of the impregnating apparatus.

When the impregnating materials are sprayed as shown in FIG. 7, a large gap is created on the suction side of the impregnating apparatus. It is of extreme importance to fill the large gap created at this point with an introduction of appropriate impregnating materials. The particular operation needed for the moving column of impregnating material through the corrugations is no longer needed. Therefore, rather than having a variety of operations as suggested hereinabove in the other embodiments of this invention, it is desired to have a succession of staggered operations acting in parallel or reciprocally. As shown in FIG. 8, the air in the corrugations is initially evacuated on both sides of the corrugated strip 2. Immediately after this evacuation, the existing vacuum formed in the corrugations is filled from both sides of the strip 2 with the spray of impregnating material. The collision of the two streams of impregnating material spray brings about an intensive utilization of impregnating material without any loss of the impregnating material occurring during practice of this method. The spray intake zones 9 as shown in FIGS. 7 and 8 are followed immediately by blocking zones 40. There is neither compressed air nor a suction created in the blocking zones 40. The staggered parallel operation as shown in FIG. 7 results in having the entire inner surface of the corrugated cardboard being perfectly treated with the impregnating material as it is introduced through the spray intake zones and movement through and out of the corrugations is blocked by the blocking zones 40. While the staggered parallel operation of FIG. 7 includes a suction zone 4', it also includes a compressed air intake zone 11 following the blocking zone 40. These latter two zones are eliminated in the staggered parallel operation wherein there are separate spray intake zones 9 located on each side of the strip 2 as it passed through the impregnating apparatus.

Figure 9:
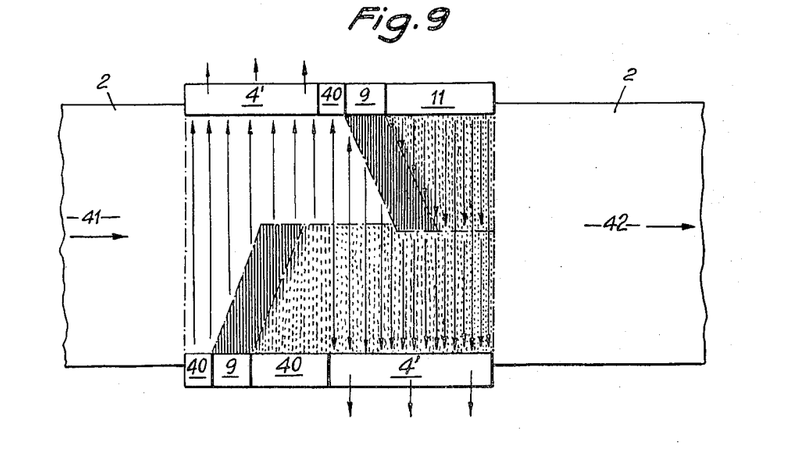
FIG. 9 shows another flow diagram when using either spray or liquid impregnating materials introduced from opposite sides of the impregnating apparatus.
Figure 10:
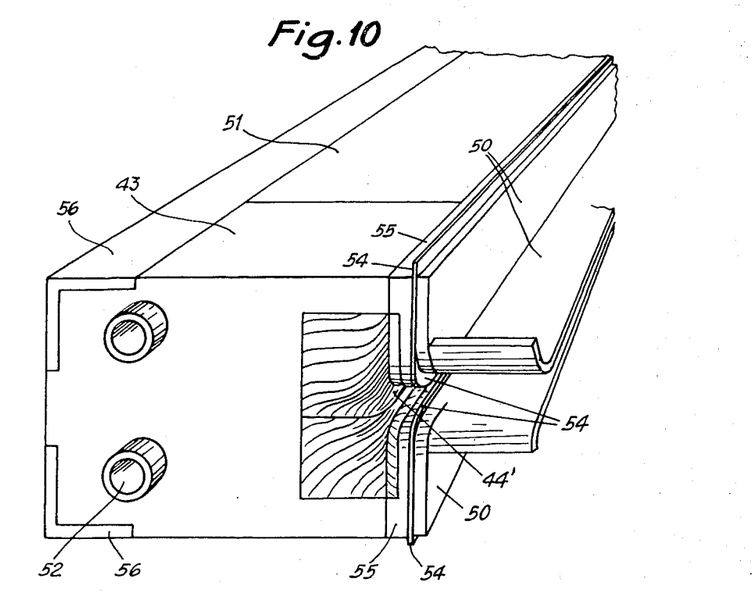
FIG. 10 is a perspective view of an element used on the suction side of the apparatus.

In the reciprocal staggered operation using columns of liquid as shown in FIG. 9, the suction zones 4' and the intake zones 9 are opposite one another so that the impregnating material can flow through every intake zone up to at least one-half the width of the corrugated cardboard strip in the direction of the suction zone 4 which lies opposite thereto. Blocking zones 40 and compressed air intake zones 11 follow intake zones 9 and suction zones 4'. The intake zones 9 and suction zones 4' are separated from each other by a blocking zone 40. The compressed air intake zone 11 removes surplus impregnating material by forcing the said impregnating material toward the suction 4' lying opposite thereto.

Once the corrugations have been filled with the spray of impregnating material, it is important to stop the flow of the spray into the corrugations. This is accomplished in FIG. 7 by use of a blocking zone 40 which is hermetically closed on the inlet side immediately after the spray zone 9. In addition, a blocking zone 40 which is also hermetically closed is placed adjacent the suction zone 4' opposite the said inlet zone 9. The compressed air intake zone 11 adjacent the blocking zone 40 on the inlet side acts to cool and dry the impregnated corrugations. With the two blocking zones 40 lying diagonally opposite to one another as shown in FIG. 7, the impregnating material has time to penetrate the layers of the paper as the strip 2 moves through the impregnating apparatus. When the impregnating material is sprayed from both sides simultaneously as shown in FIG. 8, the jets of spray meet in the middle of the width of the corrugated cardboard and automatically achieve a braking effect. The blocking zones 40 placed immediately after the intake zones 9 prevent too rapid a draining of the impregnating material which has been sprayed into the corrugations of the cardboard. Where a cold impregnating material is being sprayed in the operation in accordance with FIG. 8, an intake zone (unnumbered) for introducing hot compressed air is provided after the blocking zone 40 to form a stop on the inlet side and cause the rapid drying of material which has been sprayed into the corrugations. However, where a hot impregnating material is being used, a cold compressed air zone (unnumbered) must be used in the same manner after the blocking zone 40 to cool and congeal the impregnating material.

Any printing on the corrugated cardboard should be done immediately before the cardboard enters the impregnating stage. The printing color used stops the penetration of the impregnating agent in a manner similar to that check obtained in the use of the water film on the corrugated cardboard liner. It is possible in fact to use a water color for the purpose of obtaining the desired printing color. It is possible to build a single unit of machinery out of the combined assembly of a printing apparatus, coating installation and an impregnating apparatus.

Another important embodiment in this impregnating process involves the use of the vaporization of the impregnating material and its subsequent injection into the corrugations of the cardboard as steam. The vacuum caused through the use of the suction element 4 produces a vacuum which causes the point of vaporization of the impregnating material to be reduced. To carry out this process, the impregnating material is brought into a specially designed vacuum container for vaporization. Subsequently, the vaporized steam which is formed in the vacuum container is sucked into the furrows of the corrugated cardboard in a substantially compressed form. The impregnating material can also be injected as steam at a temperature causing it to vaporize from a condition of the finest smoke in the vacuum located within the corrugations of the cardboard.

A further embodiment of the process includes the foam covering of the corrugated cardboard with a self-hardening foam. The foam material is composed of at least two components and is mixed in a very concentrated form before it is conveyed to the corrugations. This mixing enables the foam material to reach the corrugations in a very uniform liquid state. By covering the corrugations with foam, it is possible to use a corrugated cardboard having extraordinarily large furrows with no loss of quality with regard to the covering. Impregnated corrugated cardboard having been covered with a plastic foam has an extraordinarily high insulation value. It is especially suitable for the transportation of products that are sensitive to temperature. In addition, such a treated corrugated cardboard is useful in the construction of buildings.

Figure 6:
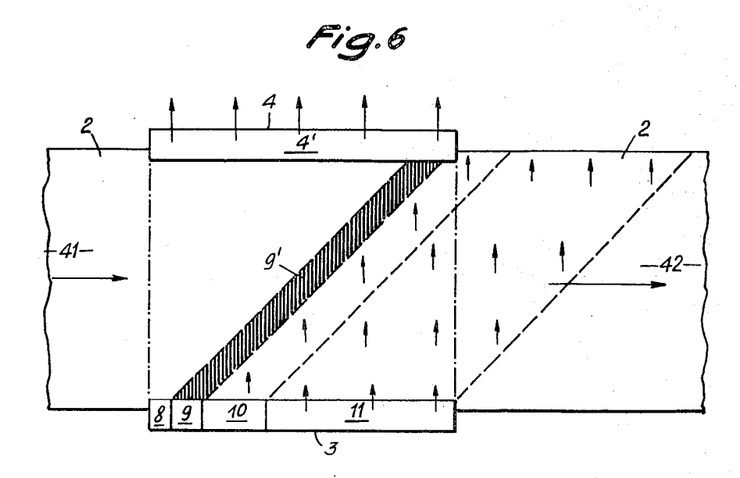
FIG. 6 shows a flow diagram when using liquid impregnating material.
Figure 11:
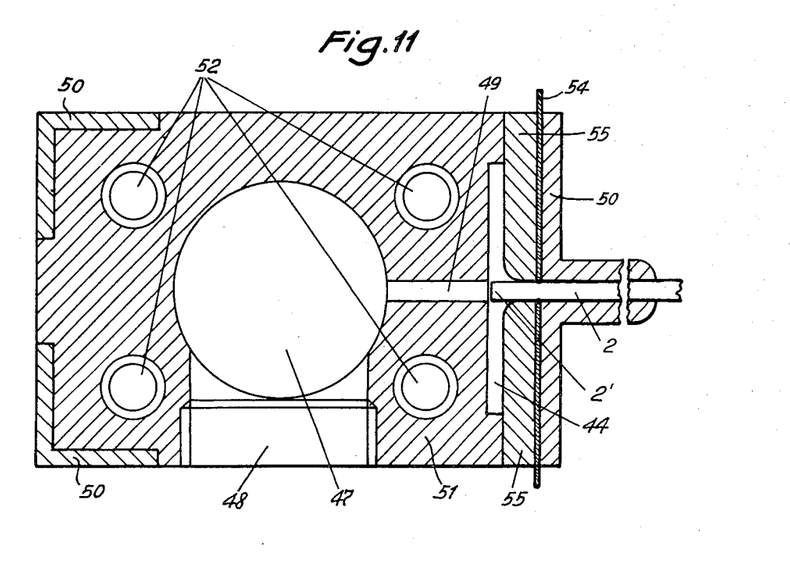
FIG. 11 is a cross-sectional view of a suction element made in accordance with this invention.
Figure 12:
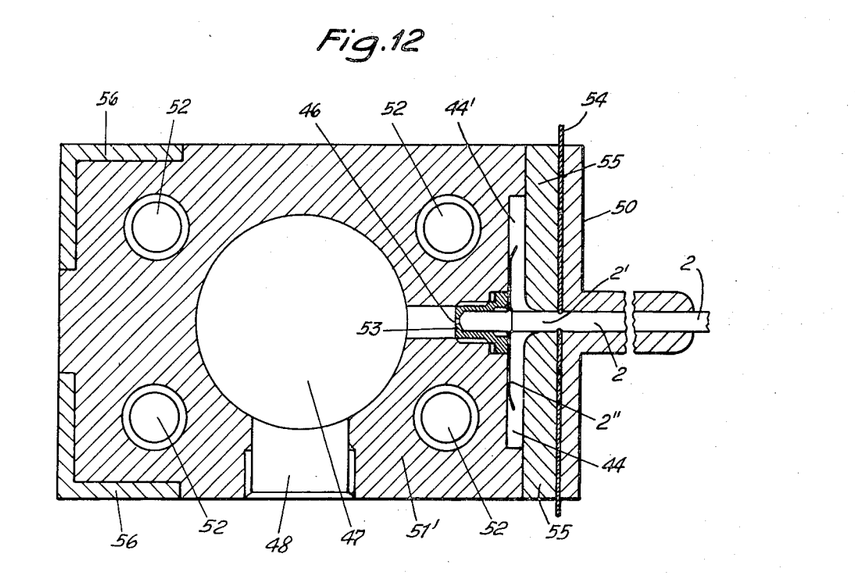
FIG. 12 is a cross-sectional view of an input element made in accordance with this invention.

An impregnating installation as shown in FIGS. 10–16 discloses an inlet element 3 and a suction element 4 which consists of mutually exchangeable and heatable standard elements composed of light metal. The suction element 4 and inlet element 3 are each assembled from at least two active and one passive component 8'. The intake head 43 is equivalent to the passive component 8 as shown in FIG. 6. This intake head 43 is located at the beginning of each of the elements 3 and 4. The intake head 43 takes care of the frictionless introduction of the longitudinal side edges of the corrugated cardboard strip 2'. The projecting lining sheets 2' located on the edges of the corrugated cardboard strip 2 are bent up in a plough shape in the intake head 43 as shown in FIG. 12. This enables the edges of the strip 2 to run into the cavity that is designed for them without causing blockages. The longitudinal sides of the corrugated cardboard strip 2' come to bear on the stop surfaces 44'. This enables the apertures of the corrugations in the cardboard to slide directly past the suction slots 49 as shown in FIG. 11 or the jet apertures 46 as shown in FIG. 12. The stop surface 44' as shown in the intake head 43 of FIG. 10 produces a simultaneous sealing of the corrugations which are subsequently evacuated.

Figure 13:
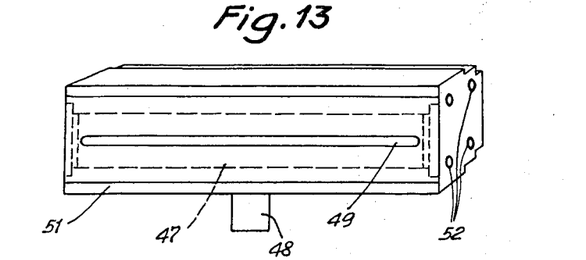
FIG. 13 is a perspective view of a suction element having the guide members removed.

There are at least two exchangeable standard elements in the suction element 4. Each shows a closed independent suction chamber 47 and a suction connection 48. The standard element as shown in FIG. 13 has a suction slot 49. The standard element can be readily exchanged on either the suction side or the intake side if a reciprocal extraction is projected. Once the joining and guiding elements 50 are released, the block 51' can be withdrawn without difficulty from the passing steam conduits 52. This procedure is also possible with the block 51' on the intake element 3 including the jets 53 which have the same diameter as the width of the suction slot 49. The guiding and joining elements 50 are adjustably mounted on the front side of the elements 3 and 4. Therefore the guiding and joining elements 50 may be adapted to any type of corrugated cardboard. Those elements 50 form one solid unit with the sealing ridges 54 and the spacing and joining elements 55. This solid unit is only released if the sealing ridges 54 have to be adjusted.

Figure 14:
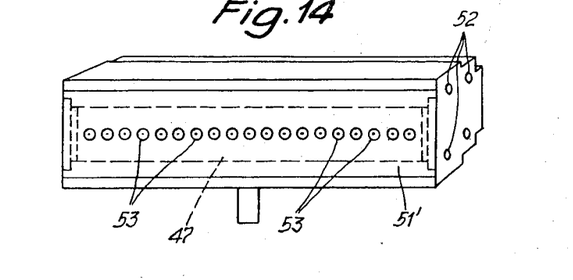
FIG. 14 is a perspective view of an input element having the guide members removed.
Figure 15:
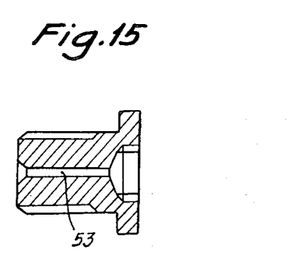
FIG. 15 is a cross-sectional view of a compressed air nozzle.
Figure 16:
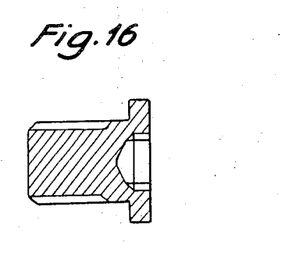
FIG. 16 is a cross-sectional view of a locking screw for the nozzle jet.

The blocks 51' as shown in FIGS. 12 and 14 constitute independent and self-contained units on the intake element 3. The block 51' has individual pressure chamber 47 and feed pipe 48 for the purpose of introducing impregnating liquid and compressed air. A stable unity is given to the intake element 3 when the stabilizing element 50, the joining element 55 and the guiding element 56 are screwed together in a contiguous manner with the steam conduits 52. The entire unit of the intake element 3 is mounted on roller rails (not shown). The unit is kept level by means of tensioning compression springs which provide an easy snug fit on the end of the furrow of the corrugated cardboard strip 2. This manner of mounting the intake element 3 and suction element 4 enables them to easily adapt themselves to any movement of the passing corrugated cardboard strip 2. The structural relationship obviously insures a high degree of efficiency in the impregnating apparatus at every phase of the passage by the corrugated cardboard strip 2 through the said apparatus.

The units of the intake element 3 and the suction element 4 may be used either for producing a suction or a positive pressure. Where it is desired to have a vacuum produced in the process, some of the standard elements of the suction element 4 will be attached to a vacuum pump. However, where it is desired to have a positive pressure acting through the particular unit, the standard elements will be attached to a blower. These units are very versatile and therefore may be readily adapted to any of the operational conditions desired in the process of this invention. The same versatility of the unit is applicable in the intake element 3 where it is desired to introduce the impregnating liquid, hot compressed air or cold compressed air. The adjustment of the amount of air and the rate of speed of the air is easily controlled by exchanging the jet 53 with other jets having larger or smaller capacities. To exchange the particular jet 53, it is necessary to loosen the front guiding elements 50 and joining elements 55 so that the joining elements 55 may be moved upward and downward into adjusting slots (not shown) on the block 51'. That is, the opening between the joining elements 55 would be made large enough to remove the jets 53 located within the block 51'. The jets 53 are threaded and provided with either socket head cap screws or slots to provide a means for readily removing the said jets from the block 51'.

The regulation of the impregnating material through the impregnating apparatus of the invention may be accomplished by metering pumps that are well known in the prior art. In all instances where compressed air is used such as in the production of a spray of impregnating material and the hot and cold compressed air units, the various pressures may be readily controlled through the use of the said metering pump.

Wetting pulleys or sealing beads may be mounted at either end of the intake element 3 and the suction element 4. The shafts of the pulleys or beads are firmly clamped at one end in a mounting while the other end of the mounting shaft is free to slide. In this way, the sealing or wetting process can conform to the movements of the impregnating apparatus.

Figure 17:
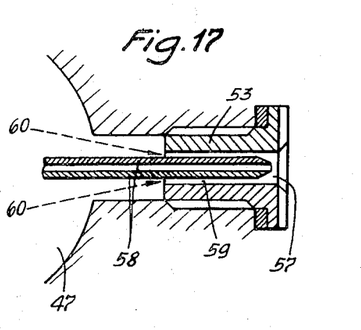
FIG. 17 is a cross-sectional view of a combination air and impregnating material spray nozzle.
Figure 18:
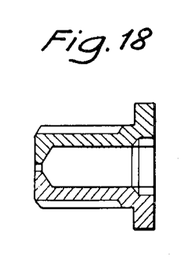
FIG. 18 is a cross-sectional view of a nozzle for a jet used with liquid.
Figure 19:
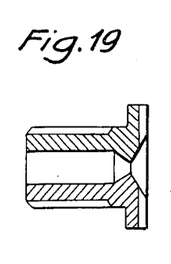
FIG. 19 is a cross-sectional view of a pressure nozzle for producing atomized impregnating material spray.

The jets 53 are made from ordinary Imbus screws which are socket head cap screws. The combined jet 53 as shown in FIG. 17 works on a spray gun principle. The supply tube 58 carrying the liquid impregnating material projects through the cavity 57 of the jet 53. A supply tube 58 is mounted concentrically with respect to the cavity 57 and thereby forms a space 59. The space 59 enables the passage of air from the pressure chamber 47 as shown by the dotted arrows 60. The flow of compressed air through the intermediate space 59 scatters the impregnating liquid flowing into the jet 53 to form a very fine spray of impregnating material.

With the advent of the instant invention, it is now possible to impregnate corrugated cardboard during the overall production of a corrugated cardboard material. The impregnation process may be accomplished before the cardboard is cut and grooved. This is advantageous because all of the corrugations in the cardboard would remain open and undamaged and therefore not impede the application of the impregnating material therethrough. Immediately after the impregnating, the cardboard is treated with lengthwise cutting and grooving tools where the grooved channels are partially pressed out. Upon entering the cutting and grooving procedures, the corrugated cardboard is still at an elevated temperature of about 70° C. to 90° C. and contains a certain moisture content. These latter two characteristics are very important for the impregnating of the cardboard material.

The impregnating material used in the impregnating process is chosen to fit the desired characteristics ultimately wanted in the impregnated corrugated cardboard. As already mentioned hereinabove, the impregnating material may be applied to the cardboard while it is in several different forms which include a liquid, a spray, a steam, a powder, a foam, a mist, a gas, a dust, etc. While the impregnating material may be selected from a high temperature melting variety, it may also be an impregnating material which is soluble at low temperatures and has volatile constituents. Choice of the particular impregnating material may also be made from an emulsion or a foaming plastic material.

The spray method of applying impregnating material is particularly suitable for the exclusive inner treatment of the corrugated cardboard. The spray operates with the finest degree of moisture and thereby has the capacity of carrying out the impregnating so that the outermost layers of the corrugated cardboard lining papers remain free of impregnating material. Therefore, the lining papers may be written on. In contrast to the spray method is the impregnating of the cardboard with a liquid wherein there is a complete permeation of all the paper layers of the corrugated cardboard material by the liquid impregnating material.

Liquid impregnating materials may be subjected to an effervescing process and then sucked through the corrugations in the form of foam. This manner of introducing foam impregnating material is distinguishable from the application of hardening foaming materials. Here the impregnating liquid provides a fine and regular moistening of the papers as the impregnating material foam is drawn through the corrugations. After the impregnated paper layers have been dried out, the corrugations are free of any remnants of the foam.

The constituents of a foaming plastic material are thoroughly mixed before introducing them into the corrugated cardboard. When the plastic foam has been sucked through the corrugations, any residue clinging to the paper layers completely effervesces in the corrugations. This plastic foam then hardens in the corrugations and creates an inseparable bonding of all the paper layers.

Impregnating material may be sucked into the corrugations as a spray or mist which is mixed with air or sprayed directly into the corrugations without air. Spray may be further refined to a fine, damp mist in a spray condensing chamber where it is heated if necessary and then subsequently sucked through the corrugations. Hot or cold impregnating material can also be sprayed into a vacuum chamber where it is vaporized. The vaporized impregnating material can then be sucked from the vacuum chamber through the corrugations. The impregnating material might also be transformed into a gas through the use of a carburetor. The drawing of the gas through the corrugations produces a sealing effect on the material and also joins the paper fibers together.

Impregnating materials that are in powder or dust form may be introduced in the corrugations of the cardboard in a very finely atomized state. They are uniformly applied to the paper layers through the use of specific moisture content of the corrugated paper, dielectric polarization or by external mechanical means. The powder impregnating material may either unite with the components of the paper or be caused to melt by the application of specific heat or through the specific heat of the corrugated cardboard. It is also possible to mix a water soluble powdered impregnating material with the moisture of fresh corrugated cardboard to impregnate the said cardboard.

Figure 20:
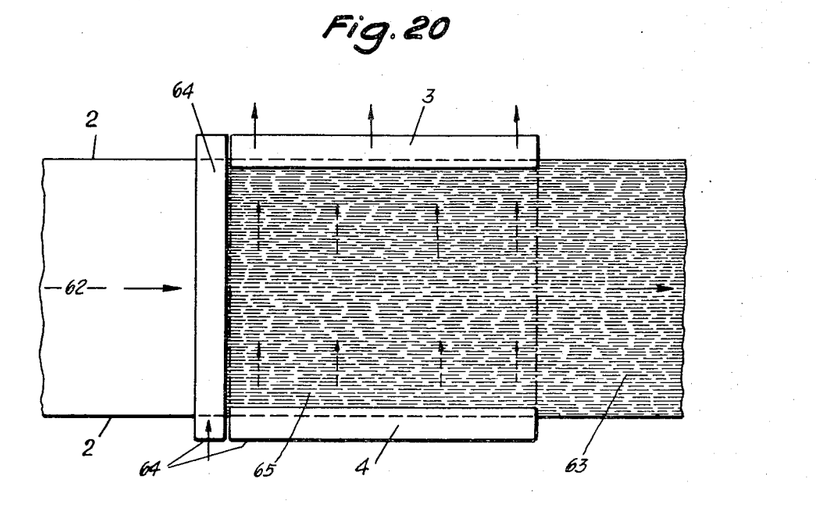
FIG. 20 is a flow diagram for the impregnating process of the instant application.

Another embodiment of this invention is shown in FIG. 20. Here the apparatus of this invention is built into a corrugated cardboard machine of a conventional type which includes a well known cross-cutter 62. The cross-cutter 62 is used to remove pieces of corrugated cardboard which are waste material that is generally a part of any corrugated cardboard that has just been introduced into the apparatus. The cross-cutter 62 also includes a longitudinal cutting and grooving tool. The two operating elements 3' and 4' lie opposite each other and firmly enclose the longitudinal edges of the corrugated cardboard strip 2. As in earlier embodiments, the longitudinal transverse edges of the operating elements 3' and 4' can be fitted with sealing elements as described hereinabove. A vacuum pump (not shown) is attached to the operating element 3' to extract air from the corrugations of the cardboard. This results in the production of a vacuum zone 65 between the operating elements 3' and 4'. The coating and impregnating apparatus 64 is mounted above and below the corrugated cardboard strip immediately in front of the zone 65. Impregnating material is then supplied to the apparatus continuously. The impregnating material is then supplied to the cardboard strip as it passes through the apparatus in any of the forms available in the process of this invention. The material is then sucked into the pores of the covering layers on the corrugated cardboard as the cardboard strip 2 passes through the vacuum 65. The coating of the corrugated cardboard is accomplished by the apparatus 64 while the impregnating material passes into the corrugations of the corrugated cardboard in the operating element 4'. Corrugated cardboard coated in this way has a layer of lining sheets which have been deeply penetrated by the impregnating material. This penetration and drawing of the impregnating material produces a corrugated cardboard that is extremely rigid and waterproof.

While the process and apparatus for impregnating corrugated cardboard has been shown and described in detail, it is obvious that this invention is not to be considered as being limited to the exact form disclosed, and that changes in detail and construction may be made therein within the scope of the invention, without departing from the spirit thereof.

We claim:

1. The method of impregnating longitudinally travelling corrugated board having a fibrous serpentine inner layer cooperating with at least one fibrous outer layer to define a plurality of parallel flutes that extend transversely of the board, comprising the steps of
   (a) continuously feeding the board longitudinally with a horizontal orientation;
   (b) sealing both ends of at least one of said transverse flutes from atmosphere;
   (c) applying suction adjacent one longitudinal edge of the board to one end of said flute to establish a vacuum therein; and
   (d) applying adjacent the other longitudinal edge of the board to the other end of said flute a mixture of particles of an impregnating material and a gaseous carrier fluid, the application of suction to said one end of said flute being maintained for a period of time to cause the impregnating material to be drawn to a desired extent through said flute.

2. The method as defined in claim 1, and further including the step of applying to at least one outer surface of the board prior to passage of the board adjacent the impregnating supply a layer of coating material of sufficient thickness to prevent outward dispersion of the impregnant material to the external surfaces of said outer layers.

3. The method as defined in claim 2, wherein said coating material comprises a film of water.

4. The method as defined in claim 2, and further including the step of varying the temperature of at least one of said impregnating and carrier materials.

5. The method as defined in claim 1, and further including the step of varying the flow of one of said impregnating and carrier materials.

6. The method as defined in claim 1, wherein said impregnating material is supplied to a plurality of longitudinally spaced supply zones relative to said travelling board, and further including the step of selectively regulating the flow of impregnant material to said zones.

7. The method as defined in claim 6, wherein said material is withdrawn from various longitudinally spaced zones relative to said board, and further including means for regulating the degree of vacuum established within said zones.

8. The method as defined in claim 1, wherein said impregnating material supplying step includes spraying atomized impregnating material into said flutes.

9. The method as defined in claim 1, wherein said impregnating material supplying step includes spraying atomized impregnating material with a carrier selected from the group consisting of air, gas and steam into said flutes.

10. The method of impregnating longitudinally travelling corrugated paperboard having a fibrous serpentine inner layer arranged between and cooperating with a pair of spaced planar fibrous outer layers to define a plurality of parallel flutes that extend transversely of the board, which comprises the steps of
    (a) continuously feeding the board longitudinally in a horizontal orientation with the flutes extending transversely of the board;
    (b) sealing a group of successive flutes at each end from atmosphere;
    (c) applying suction adjacent one longitudinal edge of the continuously fed board to evacuate successive flutes of said group and thereby establish a vacuum within each flute of said group; and
    (d) applying adjacent the other longitudinal edge of the continuously fed board a mixture of particles of an impregnating material and a gaseous carrier fluid, the application of suction to said one end of said flute being maintained for a period of time to cause the impregnating material to be drawn to a desired extent through the flutes of said group.

11. The method as defined in claim 10, wherein the suction is applied to the flutes of said group for a sufficient time to permit the impregnating material to be drawn completely through the flutes of said group.

12. The method as defined in claim 10, wherein the suction is applied to the flutes of said group for a period of time to permit the impregnating material to be drawn only partially through the flutes of said group.

References Cited
UNITED STATES PATENTS

| Number | Date | Name | Class |
|---|---|---|---|
| 1,542,824 | 7/1926 | Fairchild | 161—133 |
| 2,324,787 | 7/1943 | Lundgren | 117—119 |
| 2,478,439 | 8/1949 | Liedtke | 117—119 |
| 2,698,260 | 12/1954 | Meauze et al. | 118—63 |
| 2,826,236 | 3/1958 | Meauze et al. | 117—102 L |
| 3,343,977 | 9/1967 | Gjesdal | 117—68 |
| 3,348,989 | 10/1967 | Roberts | 156—285 |
| 3,370,982 | 2/1968 | Hayunga | 134—9 |
| 3,533,834 | 10/1970 | Marzocchi | 117—119 |

GEORGE F. LESMES, Primary Examiner

S. S. SILVERMAN, Assistant Examiner

U.S. Cl. X.R.

117—6, 95; 156—210, 285; 161—137